(12) United States Patent
Eberlein et al.

(10) Patent No.: US 10,853,693 B2
(45) Date of Patent: Dec. 1, 2020

(54) SOFTWARE LOGISTIC FOR LEARNING APPLICATIONS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 102 days.

(21) Appl. No.: 16/208,920

(22) Filed: Dec. 4, 2018

(65) Prior Publication Data

US 2020/0175336 A1    Jun. 4, 2020

(51) Int. Cl.
*G06F 9/44* (2018.01)
*G06K 9/62* (2006.01)
*G06N 20/00* (2019.01)
*G06F 11/36* (2006.01)

(52) U.S. Cl.
CPC ........ *G06K 9/6262* (2013.01); *G06F 11/3692* (2013.01); *G06N 20/00* (2019.01)

(58) Field of Classification Search
None
See application file for complete search history.

(56) References Cited

U.S. PATENT DOCUMENTS

| | | |
|---|---|---|
| 5,680,573 A | 10/1997 | Rubin et al. |
| 5,925,100 A | 7/1999 | Drewry et al. |
| 5,946,647 A | 8/1999 | Miller et al. |
| 6,055,569 A | 4/2000 | O'Brien et al. |
| 6,728,726 B1 | 4/2004 | Bernstein et al. |
| 6,810,429 B1 | 10/2004 | Walsh et al. |
| 6,996,680 B2 | 2/2006 | Mogi et al. |
| 7,284,096 B2 | 10/2007 | Schreter |
| 7,523,142 B2 | 4/2009 | Driesen et al. |
| 7,529,895 B2 | 5/2009 | Blumrich et al. |
| 7,558,822 B2 | 7/2009 | Fredricksen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |

(Continued)

OTHER PUBLICATIONS

U.S. Appl. No. 14/960,983, filed Dec. 7, 2015, Eberlein, et al.

(Continued)

*Primary Examiner* — Qamrun Nahar
(74) *Attorney, Agent, or Firm* — Fish & Richardson P.C.

(57) ABSTRACT

Implementations of the present disclosure include methods, systems, and computer-readable storage mediums for concurrent production use of an application and training of a modified application. Actions include receiving a change request that provides at least one application change for an application executed by a production system, retrieving, from the production system, a portion of production data associated to the at least one application change, executing training of a model of the application using the one or more production data to generate a trained model of the application, testing the trained model of the application to generate test results, extending the change request by adding the trained model, and providing, by the production system, the extended change request to deploy the at least one application change and the trained model to the production system.

20 Claims, 4 Drawing Sheets

(56) References Cited

U.S. PATENT DOCUMENTS

| | | |
|---|---|---|
| 7,941,609 B2 | 5/2011 | Almog |
| 7,962,920 B2 | 6/2011 | Gabriel et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,275,829 B2 | 9/2012 | Plamondon |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |
| 8,326,830 B2 | 12/2012 | Hollingsworth |
| 8,356,010 B2 | 1/2013 | Driesen |
| 8,375,130 B2 | 2/2013 | Eberlein et al. |
| 8,380,667 B2 | 2/2013 | Driesen |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,510,710 B2 | 8/2013 | Harren et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,577,960 B2 | 11/2013 | Boller et al. |
| 8,600,916 B2 | 12/2013 | Chen et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,525 B2 | 5/2015 | Harren et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,436,724 B2 | 9/2016 | Driesen et al. |
| 9,724,757 B2 | 8/2017 | Barrett |
| 2004/0117398 A1 | 6/2004 | Idei et al. |
| 2006/0069715 A1 | 3/2006 | Vayssiere |
| 2006/0098253 A1 | 5/2006 | Masuno et al. |
| 2008/0120129 A1 | 5/2008 | Seubert et al. |
| 2009/0210866 A1 | 8/2009 | Troan et al. |
| 2009/0288079 A1 | 11/2009 | Zuber et al. |
| 2009/0300597 A1 | 12/2009 | George et al. |
| 2010/0023925 A1 | 1/2010 | Shribman et al. |
| 2010/0153341 A1 | 6/2010 | Driesen et al. |
| 2011/0252415 A1 | 10/2011 | Ricci et al. |
| 2012/0089664 A1 | 4/2012 | Igelka |
| 2012/0233605 A1 | 9/2012 | Lupu et al. |
| 2012/0284080 A1 | 11/2012 | Oliveira et al. |
| 2013/0007259 A1 | 1/2013 | Pacheco-Sanchez et al. |
| 2013/0167079 A1 | 6/2013 | Ari et al. |
| 2013/0325672 A1 | 12/2013 | Odenheimer et al. |
| 2013/0332424 A1 | 12/2013 | Nos et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0258999 A1 | 9/2014 | Kathar et al. |
| 2014/0325069 A1 | 10/2014 | Odenheimer et al. |
| 2014/0325498 A1 | 10/2014 | Sirois et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0106140 A1 | 4/2015 | Biewald et al. |
| 2015/0178332 A1 | 6/2015 | Said et al. |
| 2015/0193224 A1 | 7/2015 | Ziat et al. |
| 2016/0085542 A1 | 3/2016 | Meissner et al. |
| 2016/0098267 A1 | 4/2016 | Meissner et al. |
| 2016/0098438 A1 | 4/2016 | Eberlein et al. |
| 2016/0098443 A1 | 4/2016 | Specht et al. |
| 2016/0162275 A1 | 6/2016 | Morley et al. |
| 2016/0300156 A1* | 10/2016 | Bowers .............. G06F 9/46 |
| 2016/0358101 A1* | 12/2016 | Bowers .............. G06F 9/453 |
| 2017/0025441 A1 | 1/2017 | Mori |
| 2017/0116296 A1 | 4/2017 | Specht et al. |
| 2017/0123787 A1 | 5/2017 | Burkhardt et al. |
| 2017/0161291 A1 | 6/2017 | Specht et al. |
| 2017/0185392 A1 | 6/2017 | Konrad et al. |
| 2017/0344362 A1 | 11/2017 | Burkhardt et al. |
| 2018/0232382 A1 | 8/2018 | Mayer et al. |
| 2019/0243865 A1* | 8/2019 | Rausch .............. G06F 16/2452 |
| 2019/0354621 A1* | 11/2019 | Wang .............. G06F 16/2453 |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/167,746, filed May 27, 2016, Burkhardt et al.
U.S. Appl. No. 15/285,715, filed Oct. 5, 2016, Specht et al.
U.S. Appl. No. 15/285,745, filed Oct. 5, 2016, Mayer.
U.S. Appl. No. 15/356,190, filed Nov. 18, 2016, Eberlein, Peter.
U.S. Appl. No. 15/461,236, filed Mar. 16, 2017, Richter et al.
U.S. Appl. No. 15/581,459, filed Apr. 28, 2017, Eberlein, et al.
U.S. Appl. No. 15/593,830, filed May 12, 2017, Eberlein, et al.
U.S. Appl. No. 15/847,627, filed Dec. 19, 2017, de Boer, et al.
U.S. Appl. No. 15/970,499, filed May 3, 2018, Eberlein, et al.
U.S. Appl. No. 16/173,225, filed Oct. 29, 2018, Eberlein et al.
U.S. Appl. No. 16/197,888, filed Nov. 21, 2018, Meissner et al.

* cited by examiner

SOFTWARE LOGISTIC FOR LEARNING APPLICATIONS

BACKGROUND

The training of a model needs access to production data. A typical development-test-production landscape does not contain production data from a production system in a development system. Depending on database volume and costs, sometimes production data is also not contained in a test system. The development system and the test system typically contain a subset of the production data or sample production data. The lack of access to production data leads to a problem—that a "model" cannot be trained with data typically stored in the development system or the test system. Test-data-replication concepts are available for defining which data to replicate (and encrypt). Test-data-replication concepts can be useful to develop a new model, but for the fact that training of a model to be deployed to the production system requires the production data. The duplication of production data to the development system or the test system increases the database size of these systems, which can lead to additional computing resource needs and increased costs.

SUMMARY

The present disclosure describes methods and systems, including computer-implemented methods, computer program products, and computer systems for training applications.

In an implementation, a change request that provides at least one application change for an application executed by a production system is received. A portion of production data associated to the at least one application change is retrieved from the production system. A training of a model of the application using the one or more production data to generate a trained model of the application is executed. The trained model of the application is tested to generate test results. An extended change request including the trained model is generated based on the test results. The extended change request is provided to deploy the at least one application change and the trained model to the production system.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, implementations of the present disclosure include a modification of a system configuration to provide data for a model to train in an environment, where a change is created, thereby reducing errors, as well as reducing an amount of maintenance (for example, human input). In some examples, maintenance can be reduced by triggering automated procedures to setup and delete models for a test and a training environment, and to transport the model to the test environment. Second, modified enterprise systems can be tested using the model, which is based on production data (for example, actual customer data). In this manner, testing can accurately reflect production data use in the modified enterprise system. Third, not all production data is copied for testing. Using the described implementation enables time and resource management, such that a need to copy and store large amounts of data (for example, terabytes (TB) in one or more databases) is foregone. Fourth, production data of a production enterprise system can be concurrently maintained with that of a modified enterprise system, resulting in little to no downtime experienced by users of the production enterprise system. Fifth, a newly configured process using a model can be switched on by modifying the configuration data and deploying a trained model in one step, thus avoiding inconsistent configurations.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
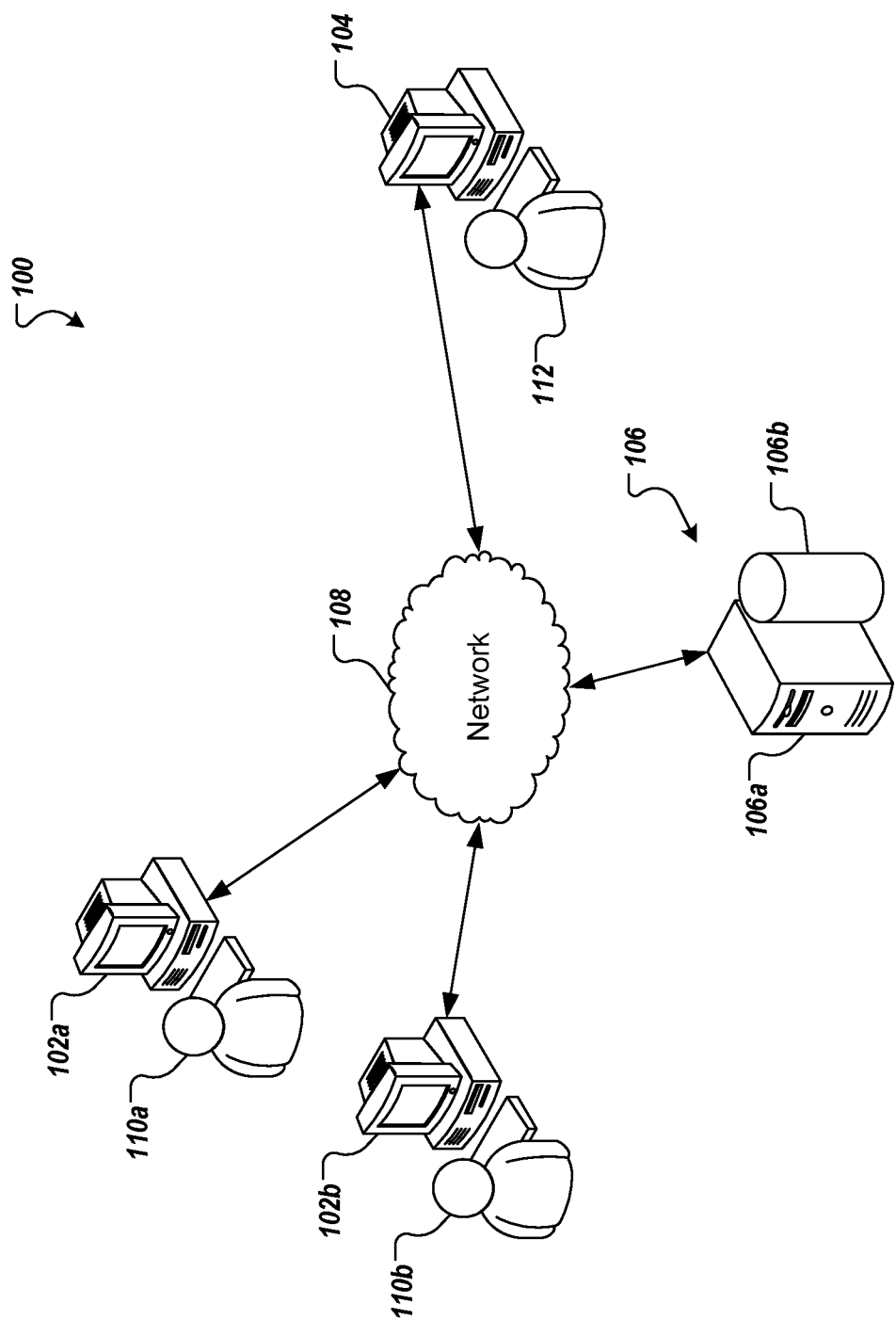
FIG. 1 depicts an example architecture that can be used to realize implementations of the present disclosure.

Implementations of the present disclosure are generally directed to training and testing modified enterprise systems without disturbing a corresponding production enterprise system. More specifically, implementations of the present disclosure are directed to testing updates to or customization of an enterprise system using a re-trainable model based on data in a production environment. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A system configured for learning applications can define or use a model for the data input that provides, for example, a digital representative of production data. A new version of an application can have a new definition of data structures and formats.

Conventional approaches for machine learning mechanisms can require access to production data. Typically, production data is not available in development or test systems. To overcome the lack of production data availability within a test system, test-data-replication concepts are available for defining, which data to replicate (and encrypt). The test-data-replication concepts can be useful to develop a new model, but for the fact that training of a model to be deployed to a production system requires the production data. Even if no restrictions would be imposed on production data accessibility, duplication of production data to development and test systems increases database size of these systems, which can lead to additional computing resource needs and increased costs. As an example, the training can require additional hardware capabilities (such as, a GPU), which again increases hardware costs. Training in production can also directly lead to performance degradation of an application, as the training can be a very hardware intense operation.

However, using techniques described in the present disclosure, a change management landscape and a change management process can be extended to support software artifacts, which are created out of production data and whose creation takes a considerable portion of available resources and time. The described implementation can prevent the need to duplicate production data and enables re-training of the model for the testing system. For example, upon deployment of a change request (for example, new software, new content, or new model software and configuration), created in a development system to a test system, a trained model is created. The change management landscape is extended by a "training system," which is only required temporarily, and which can be deployed on dedicated "training hardware." In some implementations, the training system can be shared among multiple systems (for example, day 1 for system 1, day 2 for system 2, and so on).

In some implementations, the model is accompanied by metadata defining which data is read during the training. The portion of production data indicated as necessary for training is replicated from the production system to the training system. The new configuration data is deployed to the training system. The new model software and configuration can be deployed to the training system. In response to deployment, the training is started and a "trained model" is created.

The training is de-coupled from the production system, as training resource usage does not impact the production system. Specialized hardware can be used for testing and training. During a training process, the application can continue to execute in the production system (that is, using an "old" active model).

The "trained model" can be tested together with the change request in the test system. The trained model can be retrieved from the training system to the test system. The trained model is deployed in the test system (for example, depending on a required runtime environment). The process change can be tested in the testing environment by the test system. The test results can be assessed by the test system. In response to determining that the test results include failed tests, the change request can be modified in the development system, deployed in an extended version to test, and the training can be repeated until failed tests are eliminated. The "trained model" can then be added to the change request. The extended change request (for example, new software, new content, new model software and configuration) can be extended by a "trained model." In some implementations, the extended change request can be deployed to the production system. The deployment to the production system can include transmitting: a new software, a new content, a new model software, a new configuration, and a new trained model. After deployment, the complete change of the process can be immediately active in production system.

FIG. 1 depicts an example architecture 100 that can be used to realize implementations of the present disclosure. The example architecture 100 includes client devices 102a, 102b and a client device 104 communicably connected to a back-end system 106 by a network 108. The client devices 102a, 102b are operated by users 110a, 110b, respectively, and the client device 104 is operated by a user 112. In some examples, the client devices 102a, 102b, 104 can each be a computing device such as a laptop computer, a desktop computer, a smartphone, a personal digital assistant, a portable media player, a tablet computer, or any other appropriate computing device that can be used to communicate with the back-end system 106. In some examples, the back-end system 106 can include one or more computing devices 106a, such as a server, and one or more database systems 106b. In some examples, the back-end system 106 can represent more than one computing device working together to perform the actions of a server (for example, cloud computing).

In some implementations, the database system 106b is provided as an in-memory database system. In some examples, an in-memory database is a database management system that uses main memory for data storage. In some examples, main memory includes random access memory (RAM) that communicates with one or more processors (for example, central processing units (CPUs)) over a memory bus. An-memory database can be contrasted with database management systems that employ a disk storage mechanism. In some examples, in-memory databases are faster than disk storage databases, because internal optimization algorithms can be simpler and execute fewer CPU instructions (for example, require reduced CPU consumption). In some examples, accessing data in an in-memory database eliminates seek time when querying the data, which provides faster and more predictable performance than disk-storage database systems.

In some examples, the network 108 can be a public communication network (for example, the Internet, cellular data network, dialup modems over a telephone network), a wide area network (WAN), a local area network (LAN), a private communications network (for example, private LAN, leased lines), or any appropriate combination thereof.

In accordance with implementations of the present disclosure, the back-end system 106 can host one or more enterprise systems. In some examples, an enterprise system can be provided as one or more computer-executable programs executed by one or more computing devices. Example enterprise systems can include an enterprise resource planning (ERP) system, a client-relationship management (CRM) system, a product lifecycle management (PLM) system, a supply chain management (SCM) system, and supplier relationship management (SRM) system.

In some implementations, an enterprise system can be provided in a production mode, during which users interact with the enterprise system to access functionality provided by the enterprise system, access data through the enterprise system, or generate/modify data using the enterprise system. During operation in the production mode, data that is accessed/generated/modified can be referred to as production data. In other words, production data is data that is accessed/generated/modified during real-world execution of the system.

In an example, the users 110a, 110b can be employees of an enterprise, which uses an enterprise system hosted on the back-end system 106 for operations. For example, the user 110a can use the client device 102a to interact with the enterprise system and access production data (for example, access a customer profile) stored at the back-end system 106. As another example, the user 110b can use the client device 102b to interact with the enterprise system and generate production data (for example, create a new customer profile) that is stored at the back-end system 106. In some examples, data is read from and written to the database system 106b during production use of the enterprise system.

In some implementations, after the enterprise system has been operating in the production mode, a modification to the enterprise system may be required. For example, the enterprise system can be updated (for example, update from an earlier version to a newer version) or customized (for example, implement custom features for a particular entity). Consequently, a modified enterprise system can be provided, which includes one or more modifications (for example, updates or customizations). In some examples, the modified enterprise system can be operated in a test mode to test the modifications. In some examples, testing of the modified enterprise system is performed using production data. In this manner, it can be confirmed that the modified enterprise system functions as intended with the production data before transitioning from the test mode to the production mode. In some implementations, the user 112 (for example, an administrator of the enterprise system) can use the client device 104 to perform testing of the modified enterprise system, as described in further detail herein.

As introduced above, implementations of the present disclosure enable testing of a modified enterprise system using production data. More particularly, implementations of the present disclosure enable training and testing of a model of a modified enterprise system using production data, while the enterprise system (for example, unmodified enterprise system) continues to operate in the production mode. In accordance with implementations of the present disclosure, and as described in further detail herein, a production database schema and a training database schema are provided. In some examples, a database schema is a structure that is supported by a database management system (DBMS) and refers to the organization of data stored in the database. The database schema, for example, logically groups items (for example, tables, views, or stored procedures). In some examples, a user (for example, the user 110a, 110b, 112) can be assigned permissions to a respective database schema, such that the user can only access the objects they are authorized to access.

In accordance with implementations of the present disclosure, the production database schema defines the logical groupings of objects for the database (for example, the database 106b), when the enterprise system is operating in the production mode. The training database schema defines the logical groupings of objects for the database (for example, the database 106b), when the modified enterprise system is operating in the test and training mode. In some examples, interactions of users (for example, the user 110a, 110b) during model training using production data of the enterprise system, and thus the database (for example, the database 106b), can be governed by training rules. Likewise, users (for example, the user 112) testing the modified model of the application, and thereby interacting with production data stored in the database (for example, the database 106b), during the testing mode, will be governed by testing rules.

Figure 2:
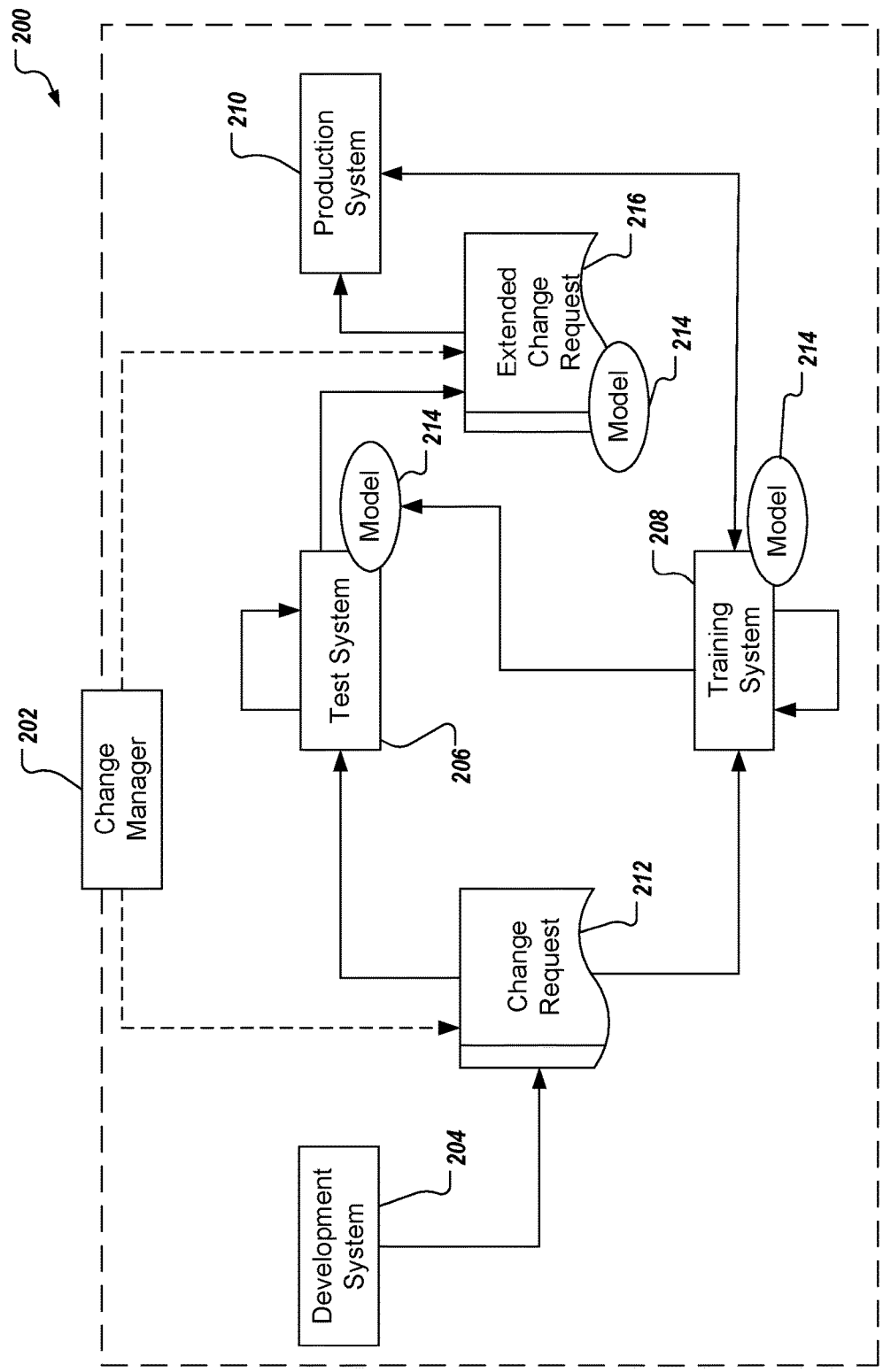
FIG. 2 is a block diagram of example learning logistic landscape, according to an implementation of the present disclosure.

FIG. 2 schematically depicts an example change management schema 200. The example change management schema 200 can include a change manager 202, a development system 204, a test system 206, a training system 208, and a production system 210. The change manager 202 can be configured to define a change workflow within the example change management schema 200, to call deployment and to manage packaging tools. For example, a developer can create a change, and notify an administrator to initiate a change process. The administrator can provide an input for the change manager 202 to start the change workflow. The change manager 202 can generate a signal that triggers the development system 204 to export a change request 212. The change request 212 can include a superset of objects, some can be missing or unchanged. For example, the change request 212 can include a new configuration for a process calling a modified model, a custom code to be used in the new process, configuration data, the model configuration data, and model software (for example, used for training).

The change manager 202 can deploy the change request 212 to the test system 206. For example, at least one of the new configuration for the process, the custom code and configuration data is deployed. The test system 206 processes the change request 212 and identifies that the change request 212 includes a change to a model configuration or model software. The test system 206 sends a signal to the change manager 202 indicating that training is required.

The change manager 202 can deploy a relevant portion of the change request 212 to the training system 208. The relevant portion of the change request 212 can include a request to add a new model configuration, to modify (for example, add or delete a portion of) the configuration data, or the model software.

The change manager 202 can retrieve relevant data from production system 210 and trigger its transmission to the training system 208. For example, the model configuration indicates which production data is processed by the training system 208 during training (for example, specifying a set of database views or tables). The indicated data is retrieved from production system 210 and transmitted to the training system 208. The transmission of the indicated data can be a "delta data transfer". For example, if some of the data is already stored by the training system 208, or an older version of the data is available, only the remaining data (for example, new data or data with data formats different from pre-stored (or cached) data) is transmitted. The data load can include configuration data. The data transmitted by the production system 210 to the training system 208 is merged with the data deployed through the change request. If there is an overlap, the configuration data is deployed after the load from the production system 210.

The training system 208 can be configured to process the current data and the stored data based on the defined configuration. For example, the training system 208 can execute a training of the model with the defined configuration. The training can be based on software deployed from the change request 212. The training process can generate as output a status information about achieved accuracy (for example, an accuracy score). An administrator or a key process user can assess the results of the training process and decide based on the results whether to continue the testing process or to modify the model configuration. For example, the accuracy score can be compared to an accuracy threshold and approve the trained model if the accuracy score exceeds the accuracy threshold. The change manager 202 can retrieve the approved model from the training system 208 and deploy the approved model to the test system 206.

The test system 206 is configured to process the approved model. The test system 206 processes the new configuration for the process, the new configuration data (or master data), the new custom code, and the newly trained model to generate a test result. In some implementations, the test results are automatically evaluated. For example, test errors can be classified as major, moderate and minor. In case only minor errors or no errors are generated, the test can be automatically marked as passing. In some implementations, the test results (for example, moderate or major errors) are assessed by users. If the test does not pass, a signal is sent to the development system 204 to trigger a change to be implemented in the development system 204 and the data identification, retrieval and training process can be repeated. If the test passes, the change request is extended by the trained model 214, which generates an extended change request 216. The extended change request 216 can be deployed by the change manager 202 to the production system 210. The extended change request 216 deploys in one step: the new configuration for the process, the new configuration data (or master data), the new custom code, or the newly trained model.

In some implementations, the model 214 is built on data which is written by the system. The model 214 can become "outdated": new data can be created, which has not been read upon training of the model 214. The change manager 202 can be configured to trigger a retraining of the model 214 to prevent letting the model 214 to become outdated. In some implementations, model re-training can be performed without altering the configuration or model configuration. Model re-training can be triggered by different events: for example, a monitoring infrastructure can generate an alert that the model is degraded, a key user can trigger model re-training, a scheduler can be defined to periodically trigger model re-training or database volume changes can be monitored to trigger re-training. The model re-training process can include sending a trigger to the change manager 202 to read the scenario definition (in the metadata) of the model 214 to be re-trained. The change manager 202 can call a data transfer. The data defined in the model metadata can be replicated in the database of the training system 208 (or the delta of the data since the last data transfer). The change manager 202 can generate a signal to initiate training of the model with the new data. The training process can return a status information about achieved training accuracy. The change manager 202 can read the new version of the model 214 from training system 208 and can deploy the new version of the model 214 to the production system 210.

Figure 3:
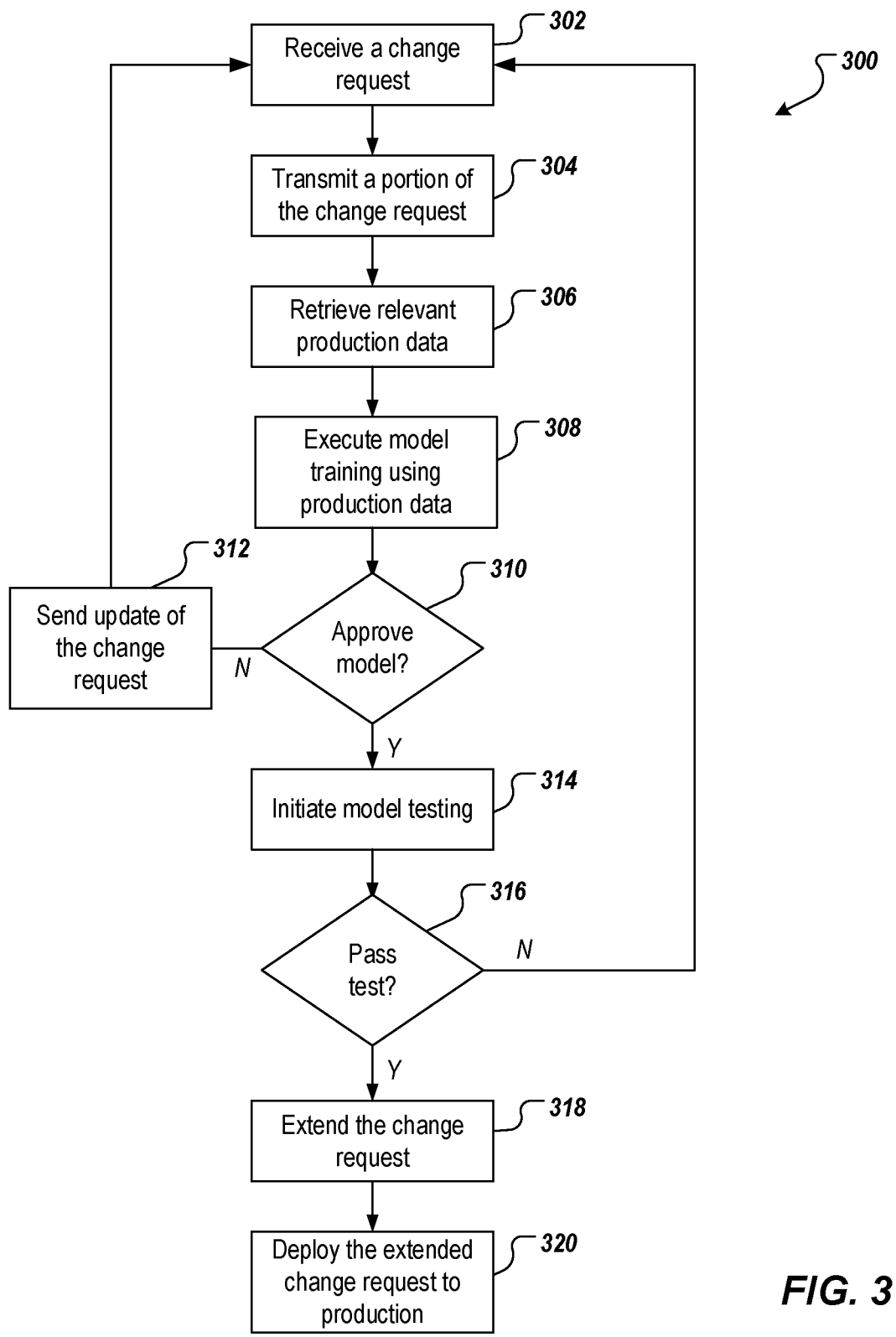
FIG. 3 depicts an example process that can be executed in accordance with implementations of the present disclosure.

FIG. 3 depicts an example process 300 that can be executed in accordance with implementations of the present disclosure. In some implementations, the example process 300 can be realized using one or more computer-executable programs executed using one or more computing devices.

At 302, a change request is received. The change request can include a set of changes of different type, some types relevant to the process described here like a change to a model configuration or model software and in addition changes of the following type: like new version of code, new entries for configuration tables, new table structure definitions and the like. The change request can indicate enhancements to production data, such as one or more existing tables. For example, the modified enterprise system is based on a production enterprise system and includes updates(s) or modification(s) of the production enterprise system. In some examples, an existing table is provided as a table of the production enterprise system, and an enhancement can include, for example, a modification of the table (for example, a new column being added to the table). In some examples, if the modified enterprise system includes enhancements to one or more tables, each table that is to be enhanced is renamed. For example, the name of a table that is to be enhanced is changed from "Table" to "Table_New." Respective views are created in a production database schema using the original table names. For example, a table view can be provided called "Table" in the production database schema. Respective structures of the one or more tables are modified and respective views can be extended in the training database schema. From 302, method 300 proceeds to 304.

At 304, a portion of the change request is transmitted. For example, the relevant portion of the change request can include a request to add a new model configuration, to modify (add or delete a portion of) the configuration data, or the model software. The change request can contain change types like new software version, new table definitions, the previously mentioned change types model configuration, and model software. In some implementations, a change request includes objects describing multiple, different single changes. The "change objects" can define a change in code, a change in table definition, or a change in table content. The change types are detected by the change request management, which are relevant for model training (like the change model configuration or model software) but not the changed table definition. In some implementations, change types include model configuration and model software. The change request containing the new change types can be detected, the respective objects of these change types are extracted and transmitted to the training system. From 304, method 300 proceeds to 306.

At 306, relevant production data are retrieved from a production system and transmitted to a training system. The transmission of the indicated data can be a "delta data transfer." For example, if some of the data is already stored by the training system, or an older version of the data is available only the remaining data is transmitted. The data load can include configuration data. The data transmitted by the production system to the training system is merged with the data deployed through the change request. If there is an overlap, the configuration data is deployed after the load from the production system. In some implementations, during training of the modified enterprise system read-access can be requested to production data. For example, read-access is requested to the enhanced table "Table_New," which stores production data, and the table view "Table_New" of the train database schema is used to read the production data. Further, during production use of the enterprise system, read access to the production data stored in the enhanced table "Table_New" is provided using the view "Table" of the production database schema. In this manner, the enhanced table is transparent to the production enterprise system. During training of the modified enterprise system read-access can be requested to data that is stored in a local table (for example, which corresponds to a respective production table). In some examples, a read-trigger causes data to be read from the local table and from the respective production table, and the data is merged, where, if the data from the local table has the same key as the data from the production table, the data from the local table is provided in response to the read request. During training of the modified enterprise system write-access can be requested to write data to a production table. In some examples, a write-trigger causes the data to be written (for example, as train data) to the respective local table. In some implementations, the portion of the production data includes (randomly) reformatting or scrambling the portion of the production data to maintain data privacy. From 306, method 300 proceeds to 308.

At 308, the execution of the model training is initiated at the training system by using the production data. For example, the training system can be configured to process the current data and the stored data based on the defined configuration. For example, the training system can execute a training of the model with the defined configuration. The training can be based on software deployed from the change request. The training process can generate as output a status information about achieved accuracy by comparing the training accuracy to a set threshold. An administrator or a key process user can assess the results of the training process and decide based on the results whether to continue the testing process or to modify the model configuration. For the training, a software module (the training software) is called with a set of parameters, the software module computing the model. The parameters can be changed to create different models. The training software returns a set of parameters (accuracy parameters) describing the quality of the model. Modifying input parameters to the training module can alter the accuracy. The training software can also be configured to read different sets of records from the training data set (for example, reading only data of the last month, or the last two months, or of certain key ranges). This can also impact the model accuracy. The administrator can review the accuracy, modify parameters, read data records, and chose a configuration which achieves the highest accuracy. After 308, method 300 proceeds to 310.

At 310, it is determined whether the model is approved. After 310, in response to determining that the model is not approved method 300 proceeds to 312.

At 312, an update of the change request is transmitted to the development system. After 312, method 300 returns to 302.

After 310, in response to determining that the model is approved, method 300 proceeds to 314.

At 314, the execution of the model testing is initiated at the test system by using the production data. For example, the test system processes the new configuration for the process, the new configuration data (or master data), the new custom code, and the newly trained model to generate a test result. After 314, method 300 proceeds to 316.

At 316, it is determined whether the test passes. In some implementations, the test results are automatically evaluated. In response to determining that the model does not pass the test, the method 300 returns to 302. For example, if the test does not pass, a signal can be sent to the development system to trigger a change to be implemented in the development system and the data identification, retrieval and training process can be repeated. In response to determining that the model passes the test, the method 300 proceeds to 318.

At 318, the change request is extended by the trained model of the application. From 318, method 300 proceeds to 320.

At 320, the extended change request is transmitted to the production system. The extended change request can include the original change request and at least an additional object. For example, the original change request can contain a model configuration to use a certain algorithm for training and a set of parameters to call the algorithm with. The algorithm computes the trained model (for example, a database stored procedure or a software module). The computed artifact (for example, the database stored procedure, computed software module) is added as an object to the change request to generate the extended change request. The extended change request, deployed to the production system, can include the computed database stored procedure or software module. For example, the extended change request deploys in one-step: the new configuration for the process, the new configuration data (or master data), the new custom code, and the newly trained model. After 320, method 300 can stop.

Figure 4:
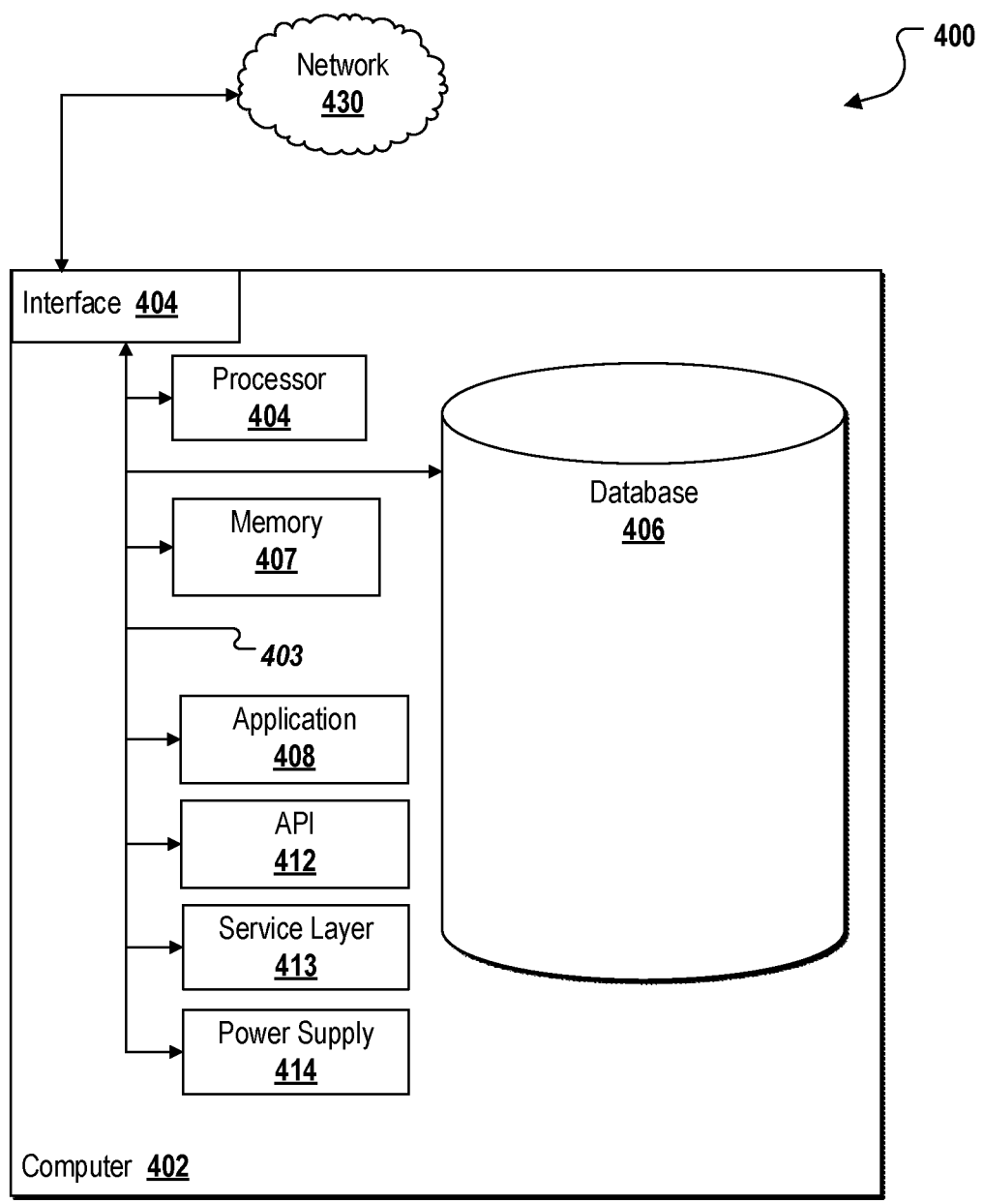
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud computing based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, email server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application-programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple Computers 402.

Described implementations of the subject matter can include one or more features, alone or in combination.

For example, in a first implementation, a computer-implemented method, comprises: receiving a change request that provides at least one application change for an application executed by a production system, retrieving, from the production system, a portion of production data associated to the at least one application change, executing training of a model of the application using the one or more production data to generate a trained model of the application, testing the trained model of the application to generate test results, generating an extended change request including the trained model, and providing, by the production system, the extended change request to deploy the at least one application change and the trained model to the production system.

The foregoing and other described implementations can each, optionally, include one or more of the following features:

A first feature, combinable with any of the following features, wherein the portion of the production data associated to the at least one application change is smaller than a whole set of the production data.

A second feature, combinable with any of the previous or following features, wherein the portion of the production data is selected from a production database of the production system based on a comparison to old production data previously stored in a training database of the training system.

A third feature, combinable with any of the previous or following features, wherein retrieving the portion of the production data includes reformatting the portion of the production data.

A fourth feature, combinable with any of the previous or following features, wherein concurrent execution of the training of the model of the application is performed without interfering with production use of the application.

A fifth feature, combinable with any of the previous or following features, wherein the change request includes a change to at least one of a model configuration and a model software.

A sixth feature, combinable with any of the previous or following features, further including: determining an accuracy of the trained model of the application, comparing the accuracy to a set threshold, and in response to determining that the accuracy exceeds the set threshold, testing the trained model of the application to generate test results.

In a second implementation, a non-transitory computer-readable storage medium coupled to one or more processors and having instructions stored thereon which, when executed by the one or more processors, cause the one or more processors to perform operations for concurrent production use of an application and training of a modified application, the operations including: receiving a change request that provides at least one application change for an application executed by a production system, retrieving, from the production system, a portion of production data associated to the at least one application change, executing training of a model of the application using the one or more production data to generate a trained model of the application, testing the trained model of the application to generate test results, generating an extended change request including the trained model, and providing, by the production system, the extended change request to deploy the at least one application change and the trained model to the production system.

The foregoing and other described implementations can each, optionally, include one or more of the following features:

A first feature, combinable with any of the following features, wherein the portion of the production data associated to the at least one application change is smaller than a whole set of the production data.

A second feature, combinable with any of the previous or following features, wherein the portion of the production data is selected from a production database of the production system based on a comparison to old production data previously stored in a training database of the training system.

A third feature, combinable with any of the previous or following features, wherein retrieving the portion of the production data includes reformatting the portion of the production data.

A fourth feature, combinable with any of the previous or following features, wherein concurrent execution of the training of the model of the application is performed without interfering with production use of the application.

A fifth feature, combinable with any of the previous or following features, wherein the change request includes a change to at least one of a model configuration and a model software.

A sixth feature, combinable with any of the previous or following features, further including: determining an accuracy of the trained model of the application, comparing the accuracy to a set threshold, and in response to determining that the accuracy exceeds the set threshold, testing the trained model of the application to generate test results.

In a third implementation, a computer-implemented system, including: a client-side computing device, and a computer-readable storage device coupled to the client-side computing device and having instructions stored thereon which, when executed by the client-side computing device, cause the client-side computing device to perform operations for concurrent production use of an application and training of a modified application. The operations include: receiving a change request that provides at least one application change for an application executed by a production system, retrieving, from the production system, a portion of production data associated to the at least one application change, executing training of a model of the application using the one or more production data to generate a trained model of the application, testing the trained model of the application to generate test results, generating an extended change request by adding the trained model, and providing, by the production system, the extended change request to deploy the at least one application change and the trained model to the production system.

The foregoing and other described implementations can each, optionally, include one or more of the following features:

A first feature, combinable with any of the following features, wherein the portion of the production data associated to the at least one application change is smaller than a whole set of the production data.

A second feature, combinable with any of the previous or following features, wherein the portion of the production data is selected from a production database of the production system based on a comparison to old production data previously stored in a training database of the training system.

A third feature, combinable with any of the previous or following features, wherein retrieving the portion of the production data includes reformatting the portion of the production data.

A fourth feature, combinable with any of the previous or following features, wherein concurrent execution of the training of the model of the application is performed without interfering with production use of the application.

A fifth feature, combinable with any of the previous or following features, wherein the change request includes a change to at least one of a model configuration and a model software.

A sixth feature, combinable with any of the previous or following features, further including: determining an accuracy of the trained model of the application, comparing the accuracy to a set threshold, and in response to determining that the accuracy exceeds the set threshold, testing the trained model of the application to generate test results.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs executing on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for concurrent production use of an application and training of a modified application, the method being executed using one or more processors and comprising:
receiving, by the one or more processors, a change request that provides at least one application change for an application executed by a production system;
retrieving, by the one or more processors from the production system, a portion of production data associated to the at least one application change;
executing, by the one or more processors, training of a model of the application using the portion of production data to generate a trained model of the application;
testing, by the one or more processors, the trained model of the application to generate test results;
generating, by the one or more processors, based on the test results an extended change request comprising the trained model; and
providing, by the one or more processors to the production system, the extended change request to deploy the at least one application change and the trained model to the production system.

2. The computer-implemented method of claim 1, wherein the portion of the production data associated to the at least one application change is smaller than a whole set of the production data.

3. The computer-implemented method of claim 1, wherein the portion of the production data is selected from a production database of the production system based on a comparison to old production data previously stored in a training database of a training system.

4. The computer-implemented method of claim 1, wherein retrieving the portion of the production data comprises reformatting the portion of the production data.

5. The computer-implemented method of claim 1, wherein concurrent execution of the training of the model of the application is performed without interfering with production use of the application.

6. The computer-implemented method of claim 1, wherein the change request comprises a change to at least one of a model configuration and a model software.

7. The computer-implemented method of claim 1, further comprising:
determining, by the one or more processors, an accuracy of the trained model of the application;
comparing, by the one or more processors, the accuracy to a set threshold; and
in response to determining that the accuracy exceeds the set threshold, testing, by the one or more processors, the trained model of the application to generate test results.

8. A non-transitory computer-readable storage medium coupled to one or more processors and having instructions stored thereon which, when executed by the one or more processors, cause the one or more processors to perform operations for concurrent production use of an application and training of a modified application, the operations comprising:
receiving a change request that provides at least one application change for an application executed by a production system;
retrieving, from the production system, a portion of production data associated to the at least one application change;
executing training of a model of the application using the portion of production data to generate a trained model of the application;
testing the trained model of the application to generate test results;
generating an extended change request comprising the trained model; and
providing, by the production system, the extended change request to deploy the at least one application change and the trained model to the production system.

9. The non-transitory computer-readable storage medium of claim 8, wherein the portion of the production data associated to the at least one application change is smaller than a whole set of the production data.

10. The non-transitory computer-readable storage medium of claim 8, wherein the portion of the production data is selected from a production database of the production system based on a comparison to old production data previously stored in a training database of a training system.

11. The non-transitory computer-readable storage medium of claim 8, wherein retrieving the portion of the production data comprises reformatting the portion of the production data.

12. The non-transitory computer-readable storage medium of claim 8, wherein concurrent execution of the training of the model of the application is performed without interfering with production use of the application.

13. The non-transitory computer-readable storage medium of claim 8, wherein the change request comprises a change to at least one of a model configuration and a model software.

14. The non-transitory computer-readable storage medium of claim 8, wherein operations further comprise:
determining an accuracy of the trained model of the application;
comparing the accuracy to a set threshold; and
in response to determining that the accuracy exceeds the set threshold, testing the trained model of the application to generate test results.

15. A computer-implemented system, comprising:
a client-side computing device; and
a computer-readable storage device coupled to the client-side computing device and having instructions stored thereon which, when executed by the client-side computing device, cause the client-side computing device to perform operations for concurrent production use of an application and training of a modified application, the operations comprising:
receiving a change request that provides at least one application change for an application executed by a production system;
retrieving, from the production system, a portion of production data associated to the at least one application change;
executing training of a model of the application using the portion of production data to generate a trained model of the application;

testing the trained model of the application to generate test results;

generating an extended change request by adding the trained model; and providing, by the production system, the extended change request to deploy the at least one application change and the trained model to the production system.

16. The computer-implemented system of claim 15, wherein the portion of the production data associated to the at least one application change is smaller than a whole set of the production data.

17. The computer-implemented system of claim 15, wherein the portion of the production data is selected from a production database of the production system based on a comparison to old production data previously stored in a training database of a training system.

18. The computer-implemented system of claim 15, wherein retrieving the portion of the production data comprises reformatting the portion of the production data.

19. The computer-implemented system of claim 15, wherein concurrent execution of the training of the model of the application is performed without interfering with production use of the application.

20. The computer-implemented system of claim 19, wherein the change request comprises a change to at least one of a model configuration and a model software.

* * * * *